(12) United States Patent
Cooper

(10) Patent No.: US 8,198,353 B2
(45) Date of Patent: Jun. 12, 2012

(54) PRIMER COATING FOR ENHANCING ADHESION OF LIQUID TONER TO POLYMERIC SUBSTRATES

(75) Inventor: Robin Cooper, Attert (BE)

(73) Assignee: Michelman, Inc., Cincinnati, OH (US)

( * ) Notice: Subject to any disclaimer, the term of this patent is extended or adjusted under 35 U.S.C. 154(b) by 52 days.

(21) Appl. No.: 12/819,266

(22) Filed: Jun. 21, 2010

(65) Prior Publication Data

US 2011/0129606 A1 Jun. 2, 2011

Related U.S. Application Data

(60) Continuation-in-part of application No. 12/267,629, filed on Nov. 10, 2008, now Pat. No. 7,767,294, which is a division of application No. 11/118,660, filed on Apr. 29, 2005, now Pat. No. 7,470,736.

(60) Provisional application No. 60/567,625, filed on May 3, 2004.

(51) Int. Cl.
*C09D 11/02* (2006.01)
*B05D 5/00* (2006.01)

(52) U.S. Cl. ........................... 524/270; 427/261
(58) Field of Classification Search .................... 524/270
See application file for complete search history.

(56) References Cited

U.S. PATENT DOCUMENTS

| | | | |
|---|---|---|---|
| 3,853,606 A * | 12/1974 | Parkinson | ..................... 428/461 |
| 5,225,306 A | 7/1993 | Almog et al. | |
| 5,276,492 A | 1/1994 | Landa et al. | |
| 5,346,796 A | 9/1994 | Almog | |
| 5,407,771 A | 4/1995 | Landa et al. | |
| 5,776,604 A | 7/1998 | Lu et al. | |
| 5,789,123 A | 8/1998 | Cleckner et al. | |
| 5,827,627 A | 10/1998 | Cleckner et al. | |
| 5,969,025 A | 10/1999 | Corzani | |
| 5,998,038 A | 12/1999 | Shibatani et al. | |
| 6,114,021 A * | 9/2000 | Pankratz et al. | ............... 428/214 |
| 6,379,787 B1 | 4/2002 | Lu | |
| 6,723,773 B2 | 4/2004 | Williams et al. | |
| 2002/0058194 A1 | 5/2002 | Williams et al. | |
| 2007/0172609 A1 | 7/2007 | Williams | |

FOREIGN PATENT DOCUMENTS

| | | |
|---|---|---|
| EP | 0789281 A2 | 8/1997 |
| EP | 1273975 | 1/2003 |
| WO | 9623659 A1 | 8/1996 |
| WO | 03029015 A2 | 4/2003 |

* cited by examiner

*Primary Examiner* — Ling Choi
*Assistant Examiner* — Hui Chin
(74) *Attorney, Agent, or Firm* — Dinsmore & Shohl LLP

(57) ABSTRACT

A primer coating is provided for use on polymeric substrates to enhance adhesion of liquid toner to the substrates for printing in an electrophotographic printing device. The primer coating includes a dispersion of a copolymer of ethylene and acrylic or methacrylic acid and a compatible adhesion enhancer comprising a hydrogenated rosin or rosin ester dispersion. The coating may also include additives such as wetting agents, antiblocking agents, matting agents, and waxes. The primer coating may be applied to a variety of polymeric substrates including polypropylene, biaxially oriented polypropylene, polyethylene terephthalate, and polyvinyl chloride.

14 Claims, No Drawings

PRIMER COATING FOR ENHANCING ADHESION OF LIQUID TONER TO POLYMERIC SUBSTRATES

CROSS REFERENCE TO RELATED APPLICATIONS

This application is a continuation-in-part application of application Ser. No. 12/267,629, filed Nov. 10, 2008, now U.S. Pat. No. 7,767,294, which is a divisional application of application Ser. No. 11/118,660, filed Apr. 29, 2005, now U.S. Pat. No. 7,470,736, which claims benefit of U.S. provisional application No. 60/567,625, filed May 3, 2004. The entire contents of said applications are hereby incorporated by reference.

BACKGROUND OF THE INVENTION

This invention relates to a primer coating for use on polymeric substrates, and more particularly, to a primer coating for enhancing the adhesion of liquid toner to polymeric films which are designed to be printed using an electrophotographic printing device.

In recent years, the use of on-demand digital printing machines utilizing liquid electrophotographic systems has become widespread. In such systems, liquid toner images are formed on a photosensitive drum and then electrically transferred onto an intermediate transfer blanket or belt for printing on a paper or polymeric film sheet or web. An example of a liquid toner for use in electrostatic printers is described in U.S. Pat. No. 5,407,771, and printers using such liquid toner are commercially available from Hewlett-Packard Company under the trade name HP Indigo. Polymeric films are often preferred for use over paper in electrostatic imaging because they are moisture resistant, flexible, and can be clear or opaque. However, liquid toners do not transfer well and/or adhere well to such films or paper substrates unless they have been treated with a coating or primer (also referred to as "optimized") to enhanced the adhesion of liquid toners. A number of coatings or primers have been developed for use on substrates such as polymeric films which render the surface of the films more receptive to liquid toners. For example, a polyamide resin in solution is known for use on such polymeric films. However, because the polyamide is dissolved in a solvent, this can lead to environmental problems when the solvent is evaporated. In addition, the solution is difficult to handle at low temperatures, as the polyamide tends to lose solubility. The coating also has a limited shelf life in storage prior to printing.

Other coatings have been developed based on ethylene-acrylic acid copolymers. As described in U.S. Pat. No. 5,789,123, an ethylene-acrylic acid copolymer based coating is used to enhance the adhesion of liquid toner to polymeric substrates such as biaxially oriented polypropylene, polyethylene terephthalate and polyvinyl chloride. However, the ethylene-acrylic acid copolymer based coating must be used in conjunction with an additional precoating which is required to form the bond between the coating and polymeric substrate.

Accordingly, there is still a need in the art for a primer coating which provides good liquid toner adhesion to a variety of polymeric substrates without the need for the application of additional precoatings, is stable and easy to handle over a wide range of temperatures, and which has an extended shelf life.

SUMMARY OF THE INVENTION

Embodiments of the present invention meet those needs by providing a primer coating for use on a wide variety of polymeric substrates such as polypropylene, biaxially oriented polypropylene (BOPP), polyethylene terephthalate, polyamide, biaxially oriented polyamide, and polyvinyl chloride. The coating provides enhanced liquid toner adhesion to such polymeric substrates without the need for an additional precoating, especially those substrates which are printed using electrophotographic printing devices.

In one embodiment, a primer coating is provided for enhancing adhesion of liquid toner to a polymeric substrate comprising a mixture of a copolymer of ethylene and acrylic or methacrylic acid and a compatible adhesion enhancer comprising a hydrogenated rosin or rosin ester dispersion. By "adhesion enhancer," it is meant that the component enhances adhesion of the coating to the substrate to which it is applied.

The primer coating preferably further includes a wetting agent selected from the group consisting of alcohols and surfactants. The primer coating may also include a matting agent comprising, for example, amorphous silica.

The primer coating also preferably includes an antiblocking agent selected from the group consisting of crosslinking agents, waxes, silica, metal hydroxides, and mixtures thereof. Where the antiblocking agent comprises a metal hydroxide, the coating preferably includes from about 0.05 to about 1.0% by weight of the metal hydroxide. Where the antiblocking agent is a crosslinking agent, the coating preferably includes from about 0.5 to 5% by weight of the crosslinking agent. A preferred crosslinking agent is a melamine formaldehyde resin.

Where the antiblocking agent comprises a wax, the coating preferably includes from about 4 to 15% by weight of the wax.

Preferably, the primer coating comprises from about 60 to 95% by weight of the ethylene acrylic/methacrylic acid copolymer dispersion. Typically, the copolymer dispersion contains from about 10 to about 40 wt % total solids. Preferably, the adhesion enhancer comprising a hydrogenated rosin or rosin ester dispersion is included in the composition in an amount of from about 10 to 40% by weight based on a 20 to 50 wt % total solids content.

The primer coating may be applied to a polymeric substrate by applying the coating to at least one major surface of the substrate and then drying the coating. The substrate is preferably selected from polypropylene, biaxially oriented polypropylene, polyethylene terephthalate, polyamide, biaxially oriented polyamide and polyvinyl chloride.

In one embodiment, the method of applying the primer coating includes treating at least one major surface of the substrate by a flame treatment or corona discharge treatment prior to applying the primer coating.

Typically, the primer coating is applied to the polymeric substrate such that when dried, it forms a coating having a thickness of from about 0.1 to about 2 microns, and more preferably, from about 0.3 to about 0.5 microns. The coated substrate may then be printed by applying liquid toner from a digital printing apparatus to the coated surface of the polymeric substrate without the need for additional precoatings.

Accordingly, embodiments of the present invention provide a primer coating and a method of applying the coating to polymeric substrates which provides enhanced toner adhesion to the coated polymeric substrates when printed with liquid toner inks using electrophotographic printing devices. These, and other features and advantages of the present invention will become apparent from the following detailed description.

DETAILED DESCRIPTION OF THE PREFERRED EMBODIMENT

The primer coating of the present invention provides a number of advantages over prior coatings in that it provides enhanced liquid toner adhesion to a number of different polymeric substrates. In addition, the coating does not require the use of any additional primers or precoatings to achieve proper adhesion, and avoids the problems of solvent-based coatings because it comprises a water-based composition.

The primer coating is based on an aqueous dispersion of a copolymer of ethylene and acrylic acid or methacrylic acid, which ensures good transfer of the ink image to the substrate. The copolymer exhibits good adhesion to ethylenic polymers as such polymers are typically the binders used in liquid toner compositions. The copolymer should have a sufficient degree of hot tack to ensure that, during printing, the image is transferred from the printing blanket under normal operating temperatures (120° C. to 140° C.) when the image is brought into contact with the substrate. Preferably, the copolymer comprises from about 65 to 95 wt % ethylene and from about 5 to 35 wt % acrylic or methacrylic acid. The copolymer may have a number average molecular weight of about 2,000 to 50,000. The copolymer is preferably prepared as an aqueous dispersion by heating the solid polymer with a water phase in a pressure reactor in the presence of a base such as ammonia or an alkali such that the base reacts with the acid groups on the polymer, and upon melting, the polymer forms a colloidal dispersion. The primer coating contains from about 60 to 95 wt % of the dispersion containing from about 10 to 40 wt % total solids. A suitable ethylene acrylic acid dispersion for use in the present invention is a 35% solids emulsion including an ammonia base which is commercially available from Michelman Inc. under the designation Michem®Prime 4990R.E.

While ethylene-acrylic or methacrylic acid copolymers exhibit good ink transferability, generally they do not have sufficient adhesion to nonpolar polymeric substrates such as polypropylene or polyethylene terephthalate. Accordingly, the primer coating further includes an adhesion enhancer which is compatible with the ethylene-acrylic or methacrylic acid copolymer dispersion and which increases adhesion to the underlying substrate without adversely affecting the transfer of the ink image to the substrate.

In one embodiment of the invention, the adhesion enhancer is in the form of a hydrogenated rosin or rosin ester dispersion. Where the toner adhesion enhancer comprises a hydrocarbon rosin or rosin ester dispersion, the coating includes from about 10 to 40 wt % of the aqueous dispersion which contains about 20 to 50 wt % solids. Preferably, a hydrogenated hydrocarbon rosin or rosin ester having a ring and ball softening point in the range of from about 70° C. to 105° C. is used. The rosin or rosin ester dispersion is preferably formed by melting the rosin or rosin ester and then dispersing the rosin in a water phase using surfactants and agitation. A suitable hydrocarbon rosin dispersion is commercially available from Eastman Chemical Resins Inc. under the designation Tacolyn 1100. Other suitable hydrocarbon rosin dispersions include Tacolyn 3166 and Tacolyn 4187, also available from Eastman Chemical Resins Inc.

Other suitable rosin dispersions for use in the invention include the use of natural rosins, which typically comprise a mixture of resin acids and esters. Natural rosins include, but are not limited to, oleoresins, tall oil, wood or gum rosins from tree and plant extrudates, wood extracts, and some tackifying resins. Wood extracts include, but are not limited to, terpernoids including polymers made from monoterpenoids (such as α-pinene, β-pinene, and dipentenes), sesquiterpenoids, diterpenoids (including labdanes), sesterpenoids, triterpenoids, tetraterpenoids, and polyterpenoids. Examples of resin acids include tricyclic diterpenoids including pimaranes such as pimaric acid, sandaracopimaric acid, isopimacric acid, delta$^8$-isopimaric acid, 7,15-pimaradienoic acid, and delta$^8$-pimaric acid; abietanes such as abietic acid, levopimaric acid, palustric acid, neoabietic acid, dehydroabietic acid, dihydroabietic acid, and tetrahydroabietic acid. Examples of resin acid derivatives include, but are not limited to, rosin esters (such as glycerol ester of rosin acid and pentaerythritol ester of rosin acid), rosin fumarics, rosin maleics, rosin phenolics, fortified rosins, and hydrogenated rosins.

The primer coating of the present invention preferably further contains a wetting agent for reducing the surface tension of the coating to wet out the substrate and to promote flow or leveling of the coating prior to drying. Suitable wetting agents include surfactants and alcohols, such as isopropyl alcohol. Preferred surfactants include nonionic acetylinic glycol-based surfactants such as Dynol™ 604 from Air Products. Other suitable surfactants include polyalkylene oxide modified polymethylsiloxanes such as Silwet® L-77 from GE Advanced Materials.

Other optional additives which may be included in the primer coating are matting agents such as amorphous silica, which maintains a matte print surface. Such additives may be present in an amount of from about 2 to 4 wt %. A preferred amorphous silica is Ace-Matt TS100, available from Degussa. If the substrate used is glossy, higher amounts of silica (up to about 15% by weight) may be used to achieve a matte print surface.

Because the primer coating exhibits a high hot tack, it is desirable to add one or more antiblocking agents to the coating to reduce residual tack when the substrate is rewound after coating and during storage. The antiblocking agents should not interfere with hot tack development and transfer of the ink image to the substrate. Preferred antiblocking agents include crosslinking agents, waxes, silica, metal hydroxides, and mixtures thereof. A preferred crosslinking agent is melamine formaldehyde resin, which may be present in an amount of from about 0.05 to 5 wt %. Other suitable crosslinking agents include sodium hydroxide, potassium hydroxide, zinc oxide, and polyethylene imine (Aziridine).

Suitable waxes include carnauba wax, oxidized polyethylene wax, and montan wax. Preferred for use is a 25% solids carnauba wax emulsion available from Michelman, Inc. under the designation Michem® Lube 160. The wax is preferably included in an amount of from about 4 to 15% by weight of the total coating.

Where metal hydroxides are added to the formulation as antiblocking agents, they are incorporated as metal ions to form a partial ionomerization of the ethylene-acrylic or methacrylic copolymer. The metal ions may be selected from Group IA, IIA, or IIB of the periodic table. Preferred for use are sodium or potassium ions in the form of their hydroxides. The hydroxides are included in amount of from about 0.05 to 1% by weight. When such metal hydroxides are used, the primer coating is preferably made by forming two ethylene acrylic acid dispersions; e.g., an ammonia dispersion based on MichemPrime 4990R.E. and a sodium dispersion based on the same ethylene acrylic acid dispersion.

The two dispersions are preferably blended in a ratio of 40 to 100 parts of the ammonia-based dispersion and 0 to 60 parts of the sodium based dispersion along with the remaining components.

Water (preferably soft water) may also be added to the primer coating to lower the viscosity of the coating and aid in the flow of the coating. The coating may contain from 0 to 30 wt % of soft water.

Before the primer coating is applied to a polymeric substrate, the surface of the substrate is optionally treated to ensure that the coating will wet out the surface of the film. The film is preferably treated using conventional techniques such as a flame treatment or a high voltage corona discharge treatment.

The primer coating is applied to the polymeric substrate in any suitable manner including gravure coating, roll coating, wire rod coating, flexographic printing, spray coating and the like. The coating composition is preferably applied such that upon drying, the coating forms a smooth, evenly distributed layer of about 0.1 to 2 microns in thickness, and more preferably, from about 0.3 to 0.5 microns in thickness, which imparts the desired printability and adhesion properties to the liquid toner ink and the substrate. After the coating is applied, it may be dried by hot air, radiant heat, or any other suitable means which provides a clear, adherent coated film.

In order that the invention may be more readily understood, reference is made to the following examples, which are intended to illustrate the invention, but are not to be taken as limiting the scope thereof.

Example 1

Several primer coating compositions were prepared in accordance with embodiments of the present invention by mixing the components listed below.

| Component | Wt. % of total composition |
|---|---|
| Formulation 1 | |
| ethylene-acrylic copolymer dispersion[1] | 53.7 |
| hydrocarbon rosin ester dispersion[2] | 23.3 |
| isopropyl alcohol | 15.4 |
| soft water | 7.6 |
| Comparative Formulation 2 | |
| ethylene-acrylic copolymer dispersion[1] | 33.5 |
| isopropyl alcohol | 20.0 |
| soft water | 46.5 |

[1]MP4990R.E from Michelman
[2]Tacolyn 1100 from Eastman Chemical Resins Inc.

Formulations 1 and 2 were coated onto a polyethylene terephthalate (PET) film having a surface energy of greater than 53 dynes/cm using a rod coater and applying 4 microns of wet coating. The coatings were dried using hot air at approximately 100° C. The coated substrates were then printed on a Hewlett-Packard Indigo sheet fed printer using liquid toner ink and tested for adhesion of primer to the substrate as well as for the adhesion of toner ink to the primer. The adhesion test was performed after 15 minutes and after 24 hours by applying adhesive tape in accordance with ISO 2409 and removing the tape after 30 minutes. If any film (primer coating) or toner removal occurred, the test was recorded as a failure; no removal of the toner or coating indicated a pass.

The comparative formulation 2 failed. In formulation 1, total adhesion of the film to the primer coating and total adhesion of the toner to the coating was achieved. The results demonstrate that an ethylene-acrylic copolymer dispersion alone, even when used in conjunction with a wetting agent and a high surface energy film, does not achieve sufficient toner adhesion when compared to formulations of embodiments of the present invention.

Example 2

Formulation 1 above was applied to corona discharge treated biaxially oriented polypropylene film (having a surface energy of greater than 40 dynes/cm) using the application method described in Example 1. The coated substrate was printed on a Hewlett-Packard Indigo series 1000 sheet fed printer and tested for adhesion after 15 minutes and 24 hours. The printed samples passed the adhesive tape test as described above. In a separate test, Comparative Formulation 2 showed adhesive failure to the OPP film when applied under the same conditions.

Example 3

Formulation 1 was applied to an opaque polypropylene synthetic paper (obtained from YUPO Corporation) using a flexographic roll coater at a coat weight of 0.7 gm/m$^2$. The coating was dried in-line using infra-red heaters and then re-wound. The coated reels were then slit and sheeted. The sheets were printed using a Hewlett-Packard HP Indigo series 1000 sheet fed printer. The printed samples passed the adhesive tape test as described above.

The coated substrates were then printed on a WS4000 Hewlett-Packard Indigo press fed printer. An uncoated reference film sample of the same BOPP was also printed for comparison purposes.

The print trials tested the following properties: transference, fixing, flaking, print cleaner, memories, and transport. Transference refers to the quality of toner ink transfer to the substrate and the compatibility of the coated substrate to toner, specifically highlight dots, thin lines, and areas of high coverage. A repeated pattern of 5 different print tests are run for approximately 200 linear meters. Any lack of transfer is noted.

Fixing refers to adhesion of the ink to the substrate. A test image prints block areas of color on the substrate, and adhesion of the ink to the substrate is tested immediately and after 1 hour intervals after printing. Reaching 100% adhesion within 15 minutes is considered good.

Flaking refers to the tendency for the ink to flake off the substrate. This test shows the adhesion and flexibility of the substrate-coating-ink interfaces.

Number of print cleanings refers to the number of sheets needed to remove any residual toner ink left on the blanket or photo imaging plate and get a completely clean image. This is done by printing a number of A4 100% yellow images. Ideally, a low number should be used, showing that 100% ink transfer from the blanket to the substrate is occurring.

Memories refers to a stress test conducted to see if a memory of a previous image is transferred to the next substrate. This is another way of testing to see if the coated substrate provides 100% ink transfer from the blanket.

Transport refers to any web feeding problems which occur during printing.

The results of the tests with regard to Formulation 1 are shown below in Table 1.

TABLE 1

| Film | Transference | | | Fixing | | | # print cleans needed | Memories | Paper transport | Remarks |
|---|---|---|---|---|---|---|---|---|---|---|
| | Highlight dot | thin lines | high coverage | 15 min. | 60 min. | Flaking | | | | |
| Transparent BOPP | Pass | Pass | Pass | 100% | 100% | None | 1 | None | Pass | Immediate adhesion 100% |
| Opaque BOPP | Pass | Pass | Pass | 100% | 100% | None | 1 | None | Pass | Immediate adhesion 100% |
| Opaque PP | Pass | Pass | Pass | 100% | 100% | None | 1 | None | Pass | Immediate adhesion 85% |
| Glossy Paper | Pass | Pass | Pass | 100% | 100% | None | 1 | None | Pass | Immediate adhesion 85% |

All of the coated substrates coated with Formulation 1 exhibited excellent printability on the HP Indigo WS4000 printer with the exception of the uncoated reference sample, which was found to be unprintable, i.e., no print was transferred to the sample.

Example 4

Another primer coating composition was prepared in accordance with an embodiment of the present invention by mixing the components listed below and heating for two hours at about 130° C.

| Formulation 3 | |
|---|---|
| Component | Parts by Weight |
| ethylene-acrylic copolymer dispersion[1] | 15 |
| hydrocarbon rosin ester dispersion[2] | 13.95* |
| soft water | 71.05 |

[1]Primacor 5990 from Dow Chemical
[2]Foral ® AX rosin from Hercules
*(includes 3.95 parts by weight 0.5% ammonia solution)

While certain representative embodiments and details have been shown for purposes of illustrating the invention, it will be apparent to those persons skilled in the art that various changes in the methods and apparatus disclosed herein may be made without departing from the scope of the invention.

The invention claimed is:

1. A primer coating for enhancing adhesion of liquid toner to a polymeric substrate comprising a mixture of:
   a) about 60 to 95% by weight of a copolymer of ethylene and acrylic or methacrylic acid in an aqueous dispersion containing from about 10 to about 40% by weight total solids; and
   b) about 10 to 40% by weight of an adhesion enhancer comprising a hydrogenated rosin or rosin ester aqueous dispersion containing from about 20 to about 50% by weight total solids.

2. The primer coating of claim 1 wherein said hydrogenated rosin or rosin ester dispersion comprises a hydrogenated hydrocarbon rosin or rosin ester dispersed in a water phase.

3. The primer coating of claim 1 wherein said hydrogenated rosin or rosin ester dispersion comprises a natural rosin dispersion.

4. The primer coating of claim 1 comprising from about 2 to 20 wt % of an antiblocking agent.

5. The primer coating of claim 1 further including a wetting agent selected from the group consisting of alcohols and surfactants.

6. A coated polymeric substrate having first and second major surfaces, with at least one of said major surfaces having coated thereon a primer coating for enhancing adhesion of liquid toner thereto, said coating comprising a mixture of about 60 to 95% by weight of a copolymer of ethylene and acrylic or methacrylic acid in an aqueous dispersion containing from about 10 to about 40% by weight total solids and about 10 to 40% by weight of an adhesion enhancer comprising a hydrogenated rosin or rosin ester aqueous dispersion containing from about 20 to about 50% by weight total solids.

7. The coated polymeric substrate of claim 6 wherein said substrate is selected from polypropylene, biaxially oriented polypropylene, polyethylene terephthalate, polyamide, biaxially oriented polyamide and polyvinyl chloride.

8. The coated substrate of claim 6 wherein said primer coating is about 0.1 to about 2 microns thick.

9. A method of applying a primer coating to a polymeric substrate for enhancing adhesion of liquid toner thereto comprising:
   1) providing a polymeric substrate having first and second major surfaces; and
   2) applying a primer coating to at least one of said major surfaces of said substrate; said primer coating comprising from about 60 to about 95 wt % of a copolymer of ethylene and acrylic or methacrylic acid in an aqueous dispersion containing from about 10 to about 40% by weight total solids; and from about 10 to about 40 wt % of a compatible adhesion enhancer comprising a hydrogenated rosin or rosin ester aqueous dispersion containing from about 20 to about 50% by weight total solids.

10. The method of claim 9 wherein said primer coating comprises from about 0.05 to about 1.0% by weight of a metal hydroxide.

11. The method of claim 9 including treating said at least one major surface of said substrate by a flame treatment or corona discharge treatment prior to applying said primer coating.

12. The method of claim 9 including drying said primer coating after applying said coating to said at least one major surface of said substrate.

13. The method of claim 9 including printing said polymeric substrate by applying liquid toner from a digital printing apparatus to the coated surface of said polymeric substrate.

14. A method of printing a polymeric substrate comprising:
providing a polymeric substrate having first and second major surfaces, with at least one of said major surfaces having coated thereon a primer coating comprising about 60 to about 95 wt % of a copolymer of ethylene and acrylic or methacrylic acid in an aqueous dispersion containing from about 10 to about 40% by weight total solids; and from about 10 to about 40 wt % of a compatible adhesion enhancer comprising a hydrogenated rosin or rosin ester aqueous dispersion containing from about 20 to about 50% by weight total solids; and
applying liquid toner from a digital printing apparatus to the coated surface of said polymeric substrate.

* * * * *